3,012,986
UREA-FORMALDEHYDE MODIFICATION OF BRANCHED CHAIN POLYAMIDES AND PRODUCT OBTAINED THEREBY
Melvin F. Maringer and Stanley P. Rowland, Cincinnati, Ohio, assignors to National Distillers and Chemical Corporation, New York, N.Y., a corporation of Virginia
No Drawing. Filed July 9, 1959, Ser. No. 825,893
11 Claims. (Cl. 260—45.2)

This invention relates to novel chemical derivatives of synthetic linear polyamides and to processes for producing the same. More particularly, the invention pertains to treatment of certain polyamides with a specific modifying compound.

The polyamides used for preparation of the novel products herein described may be prepared by reacting a diamine with dicarboxylic acid reactants or an amide-forming derivative of said dicarboxylic acid reactants, the reaction being carried out under condensation-polymerization conditions until polyamides of relatively high molecular weight are produced.

The diamine reactant is characterized by having at least one hydrogen atom attached to each nitrogen atom. Suitable diamines include the primary diamines. Aliphatic diamines are preferred, such amines being characterized by having the nitrogen atoms attached to aliphatic carbon atoms. More preferably, the aliphatic diamines contemplated for usage are those of relatively long chain length, as for example, a chain length of four or more carbon atoms, with specific examples thereof being aliphatic diamines such as tetramethylene diamine, pentamethylene diamine, hexamethylene diamine, octamethylene diamine, decamethylene diamine, dodecamethylene diamine, 1,6-diaminooctane, 3,6-diaminooctane, 2-ethyl-1,8-diaminooctane, 2,5-diethyl-1,6-diaminohexane, and the like. Structurally, diamines suitable for practice of this invention may be defined as having the formula $NH_2RNH_2$ in which R is a divalent hydrocarbon radical free from olefinic and acetylenic unsaturation and which has a chain length of at least four carbon atoms. Although such amines in which R is an aliphatic chain are preferred, diamines of the aforesaid structural formula in which R may be alicyclic, aromatic or arylaliphatic and in which the amino groups are attached to aliphatic carbon atoms, are also contemplated.

The dicarboxylic acid reactant comprises isomeric, branched chain $C_{10}$ aliphatic dicarboxylic acids, and mixtures thereof with aliphatic dicarboxylic acid such as sebacic, adipic, and azelaic, the branched chain dicarboxylic acids, and especially a mixture of such $C_{10}$ dicarboxylic acids made up from and including substantial amounts and major proportions of 2-ethylsuberic and 2,5-diethyladipic acids. These branched chain $C_{10}$ dicarboxylic acids and mixture thereof are preferably, but not necessarily, obtained as mixtures and by the method disclosed in U.S. Patent No. 2,816,916. Thus the polyamides to which the invention relates may be prepared by reaction between a suitable diamine and one or more branched chain $C_{10}$ dicarboxylic acids having at least one $C_2$ branch per molecule. Preferred mixtures of aliphatic $C_{10}$ dicarboxylic acids comprise a major proportion of the branched chain dicarboxylic acids and, more specifically, about 5–45% sebacic acid, about 50–60% 2-ethylsuberic acid, and about 5–15% 2,5-diethyladipic acid. Removal of a portion of the sebacic acid produces an isomeric mixture of $C_{10}$ aliphatic dicarboxylic acids containing about 72–80% 2-ethylsuberic acid, about 10–20% of 2,5-diethyladipic acid, and the remainder, about 5–15%, substantially sebacic acid. The polyamide feed materials as embodied herein are prepared by subjecting a suitable diamine and the appropriate dicarboxylic acid deactants to amidation or transamidation reaction conditions with elimination of water or other by-products formed by the reaction. In accordance with the preferred method of this invention, the polyamides will be prepared from 2-ethylsuberic acid, 2,5-diethyladipic acid and mixtures thereof. It will be understood, however, that minor amounts of sebacic, adipic, and/or azelaic acid may be present in the dicarboxylic acid feed; and, furthermore, that the use of the total mixture of $C_{10}$ dicarboxylic acids prepared by the process of U.S. Patent No. 2,816,916 is contemplated. Thus, the polyamides used in the process of this invention as embodied herein are characterized by containing a plurality of units of the following structure:

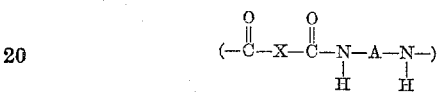

in which X is a hydrocarbon portion of a saturated aliphatic dicarboxylic acid having from about 6 to 10 carbon atoms per molecule, and A is a hydrocarbon portion of a diamine; said polyamides being further characterized in that the major proportion of such units of the aforesaid polyamide structure are such that X is the hydrocarbon portion of a $C_{10}$ saturated aliphatic dicarboxylic acid containing at least one $C_2$ branch chain per molecule.

The polyamides embodied herein can be prepared by heating in substantially equimolecular amounts a suitable diamine and the dicarboxylic acid reactant under condensation-polymerization conditions, generally from about 180° to about 300° C., in the presence or absence of a diluent, until relatively high molecular weight linear condensation polyamides are obtained and, preferably, until the polyamide possesses fiber-forming properties. The preparation of polyamides may be carried out in any of several ways. For example, the diamine and dicarboxylic acid reactant may be intimately mixed in proper proportions and the mixture subjected to condensation-polymerization conditions in which case the first reaction that occurs is the formation of diamine-dicarboxylic acid salts, followed by polymerization to formation of polyamides. Another method comprises preparation of a mixture of proper proportions of the diamine and dicarboxylic acid reactant and subjecting the mixture to conditions for formation of diamine-dicarboxylic acid salts, isolation of the salts, purification thereof if desired, and subjecting the salts to reaction conditions for polyamide formation.

As aforesaid, polyamides as embodied herein may also be prepared by use of an amide-forming derivative of the dicarboxylic acid component or components. For such preparations, use is contemplated of amide-forming derivatives of the branched chain $C_{10}$ dicarboxylic acids, and/or of other dicarboxylic acids used in admixture therewith, such amide-forming derivatives including anhydrides, amides, acid halides, half-esters and diesters which are known to form amides when reacted with a primary or secondary amine. Specific amide-forming derivatives contemplated for use herein include esters of the branched chain $C_{10}$ dicarboxylic acids, illustrative of which are the diethyl and dimethyl esters of 2-ethylsuberic acid and of 2,5-diethyladipic acid and mixtures thereof. The reactions are carried out under a blanket of dry oxygen-free nitrogen at both atmospheric and subatmospheric pressures and under suitable reaction temperatures by provision of constant temperature conditions. It will be understood, however, that the exact method of preparing the polyamides is not an essential feature of the present invention.

Examples of specific polyamides to be treated in accordance with the process of this invention include polyhexamethylene 2-ethylsuberamide, polyhexamethylene 2,5-diethyladipamide, and copolyamides derived from, for example, the total $C_{10}$ dicarboxylic acid mixture described above. Although these polyamides have a number of uses and their high solubility and substances such as ethanol are attractive advantages in connection with facilitating the ease of application of films through alcoholic solutions, it is desirable that the final products have resistance to solvents such as alcohol (specifically ethanol) and acids (specifically hydrochloric acid) as well as to other solvents such as hydrocarbons, ketones, etc. It would be advantageous, therefore, to have a method for altering these polyamides so as to elevate their softening points and to improve their solvent resistance.

One object of this invention is to modify the aforementioned polyamides so as to enhance their utility. Another object is to improve such properties as resistance to solvents, clarity, hardness, and the like. Further objects and advantages of the present invention will appear from the more detailed description set forth below.

In accordance with the present invention, these objects are accomplished by treating the polyamides with urea-formaldehyde condensates or resins, which are compatible with the polyamides under the operating conditions employed. Methylolurea and dimethylolurea are illustrative compounds. Other operable materials include urea-formaldehyde condensates having molecular weights within the range of about 85 to 2000, and alkoxy-modified urea-formaldehyde condensates such as methylated, ethylated, propylated, butylated urea-formaldehyde condensates, and the like. The latter agents are obtained by preparing the urea-formaldehyde condensates in the presence of low molecular weight alcohols having from about 1 to 8 carbon atoms, preferably 4 or less carbon atoms per molecule. The use of dimethylolurea is, however preferred, and for purposes of illustration the process of the invention will be generally described throughout the specification in terms of utilizing the preferred modifier. The exact mechanism involved in the treatment is not completely understood, although it is believed a reaction occurs between the polyamide and the modifier.

The modified branched chain polyamides embodied herein may be prepared by heating suitable amounts of the polyamides and the modifier in the presence of a catalyst until modified polyamides with appreciably improved solvent resistance and hardness are obtained. In one manner of carrying out the reaction, the desired quantity of dimethylolurea, branched chain polyamide, and catalyst are contacted in a common solvent. Suitable solvents are alcohols, e.g. methanol, ethanol, isopropanol, butanol, and mixtures thereof with water, ketones or aromatic hydrocarbons. In a broader sense any solvents or solvent combinations for bringing the polyamide and the dimethylolurea into intimate contact would be suitable for this purpose. Reaction is effected between the polyamide and dimethylolurea by exposing the solution to elevated temperatures for a period of time sufficient to complete the desired reaction. The reaction between the polyamide and the urea-formaldehyde condensate may be conducted within the range between room temperature and 250° C.; the most appropriate temperature will depend upon the particular nature of the components and to great extent upon the activity of the catalyst which is employed. Thus, the preferred range for the operation will be a consequence of the nature of the particular component (including the catalyst) employed in the specific modification and as cure may be effected at room temperature in certain cases of catalysts such as titanium tetrachloride, boron trifluoride, phosphoric-type catalysts, and etc., it will be desirable in other cases, such as those employing p-toluene sulfonic acid, to conduct the cure in the range of 150° C. (10 min. is adequate) to 200° C. (2 min. is adequate). Above 250° C. however, there is no noticeable improvement in reaction rate or product quality. Where the reaction is carried out at atmospheric pressure and solvents are present whose boiling points lie below the aforementioned reaction temperature, it is preferred to volatilize most of such solvents at temperatures below their boiling points before raising the temperature to the desired range. Such a technique contributes to homogeneous products substantially free of blushing and blisters. The modified polyamide thereby produced may be cast into films, molded, or drawn into fibers either during or after solvent removal.

The duration of heating within the preferred range required to produce given increases in solvent resistance and hardness with various ratios of dimethylolurea to polyamide will generally range from about one to fifty minutes, although longer time periods may be employed. For example, when 7.1 parts of polyhexamethylene 2-ethylsuberamide were contacted in ethanol with one part of dimethylolurea and 0.8 part of p-toluenesulfonic acid catalyst followed by removal of most of the solvent, a reaction temperature of 150° C. needed to be applied for a period of only ten minutes before a substantial increase in both solvent resistance and hardness was realized. As little as 0.1 part of dimethylolurea added to one part of branched chain polyamide produces surprising and substantial increases in solvent resistance and hardness. It is preferred to add from about 1 to 10 parts of the polyamide to each part of the urea-formaldehyde condensates, although ratios of 20 to 1 or higher achieve some improved results. The addition of greater proportions of modifier generally tends to decrease solvent resistance and hardness.

Catalysts suitable for use in this invention are acids, including both mineral acids and organic acids. Examples are hydrochloric acid, sulfuric acid, phosphoric acid, p-toluenesulfonic acid, butyl phosphoric acid, titanium tetrachloride, tetrabutyl titanate, stannic chloride, and the like. A concentration of catalyst in the range of 0.5 to 10 percent by weight, based on dimethylolurea, is satisfactory. A range of catalyst between 0.5 and 2% by weight is preferred. The catalyst may be admixed either as the pure compound or in solution, with either a solution of the polyamide feed, a solution of dimethylolurea, or a solution of the combined reactants prior to submitting the reaction mixture to elevated temperatures.

The aforedescribed reactions for preparing modified branched chain polyamides may be carried out in a batchwise, semi-continuous, or continuous manner, and it is not intended to limit the process to any particular method of operation.

The hereindescribed modified polyamides are useful for application as components or major constituents of special film-forming compositions for protective and/or decorative use. They also find use in plastic composition extrudable into tubing or various shapes or moldable into housewares, gears, and the like.

In order to further describe the invention, the following examples set forth results obtained by carrying out embodiments of the invention and, for comparison purposes, results obtained by carrying out the process under identical conditions except for the inclusion of dimethylolurea. These examples and embodiments are illustrative only, and the invention is not in any way intended to be limited specifically thereto except as indicated by the appended claims. All parts are expressed by weight unless otherwise indicated.

EXAMPLE I

The polyamide feed material used in Runs 1 and 2 to illustrate embodiments of this invention was prepared in the following manner:

181 g. of 2-ethylsuberic acid was dissolved in 1500 ml. of absolute ether. This solution was then placed in an ice bath, and 261.6 ml. of a methanolic solution containing 103.1 g. of hexamethylene diamine was added dropwise with stirring. The resulting crystalline salt precipitate was collected by filtration and washed with three volumes of ether.

263 g. of the salt was charged to a glass polymerization tube along with 29.45 ml. of a methanolic solution of hexamethylene diamine prepared in the same manner as that described above. The tube was covered with aluminum foil and inserted into a pressure bomb. The bomb was flushed with nitrogen and at the same time warmed to distill off the methanol from the salt mixture. Following this, the bomb was sealed and the temperature gradually raised to 282° C. by means of methyl phthalate vapor. This temperature was maintained for about four hours. Pressure was maintained at 250 to 500 p.s.i. by bleeding off vapor. The bomb was then depressurized and the pressure gradually reduced to about 0.5 mm. After about six hours of heating at 282° C. under vacuum, the bomb was cooled, then brought to atmospheric pressure under a nitrogen blanket. The polymer was removed by breaking away the glass of the polymerization tube.

The polyamide obtained exhibited the following properties:

| Melt Point, ° C. | | Mol. Wt. | Intrinsic Viscosity | Tensile Strength | |
| --- | --- | --- | --- | --- | --- |
| Softening Point | Complete Melt | | | Ultimate | Percent Elongation |
| 40 | 180 | 23,100 | 1.135 | 6,900 | 210 |

*Run 1.*—5 parts of the unmodified polyamide was dissolved in 95 parts of ethanol. .06 part of p-toluenesulfonic acid was added and the resulting solution cast to a 5 mil film on a glass plate. A large part of the solvent was removed from the film by exposing it for 90 minutes in forced-air at 50° C. The film was then baked in a forced-air oven for 10 minutes at 150° C. The finished film was hazy and slightly flexible. It exhibited a hardness of Sward 32. A piece of the film was placed in a jar and immersed in 10 ml. of ethanol. The jar was sealed, then stored for 24 hours in an oven regulated to 70° C. At the end of this time, the polyamide had dissolved completely, producing a clear, colorless solution. In a similar test run in concentrated HCl for 24 hours at room temperature (about 20° C.) the polyamide completely dissolved to yield a clear, colorless solution. The polyamide before this treatment exhibited the same solubility, appearance, and flexibility, consequently the above described treatment in the absence of dimethylolurea did not alter the characteristics of the polyamide. The reaction conditions and properties of the treated unmodified polyamide as well as those of the subsequently modified polyamide are presented in the following table.

*Run 2.*—To 10 parts of a 5% by weight solution of the unmodified polyamide in ethanol (0.5 part polyamide) was added 0.5 part of a 14% by weight solution of dimethylolurea (0.07 part dimethylolurea) and 0.03 part of a 20% by weight solution of p-toluenesulfonic acid in ethanol (0.006 part of p-toluenesulfonic acid). The resulting solution was cast to a 5 mil film on a glass plate. Most of the solvent was removed as in Run 1, and the film then baked for 10 minutes at 150° C. The resulting film was clear, and harder and less flexible than the unmodified polymer. Solubility tests in ethanol and concentrated HCl, performed as in Run 1, revealed the modified product to be only slightly attacked by these solvents. Consequently, modification of branched chain polyamides with dimethylolurea produces substantial and unexpected increases in solvent resistance, clarity, and hardness, as well as decreases in flexibility.

*Table*

| | Runs | |
| --- | --- | --- |
| | 1 | 2 |
| Reaction Conditions: | | |
| Polyamide/Modifier | | 7.1. |
| Solvent | Ethanol-Water | Ethanol-Water. |
| Catalyst | p-toluene-sulfonic acid. | p-toluene-sulfonic acid. |
| Heat Treatment | 10' @ 150° C | 10' @ 150° C. |
| Properties of Product: | | |
| Sol. in Ethanol | V. Sol | V. Sl. Sol. |
| Sol. in Conc. HCl | V. Sol | V. Sl. Sol. |
| Clarity | Slight Haze | Sparkling Clear. |
| Hardness | Sward 32 | Sward 48. |

EXAMPLE II

A polyamide is prepared from hexamethylene diamine and a combination of $C_{10}$ dicarboxylic acids containing 74% of 2-ethylsuberic acid, 11% of sebacic acid and 15% of 2,5-diethyladipic acid. This polyamide exhibited a softening point of 45° C. with complete melt at 175° C.; the intrinsic viscosity as determined in 90% formic acid was 1.32. This polyamide is dissolved in ethanol to yield a solution having a polymer concentration of 7%. This solution of polyamide is combined with a 15% solution of dimethylolurea and a 20% solution of xylene sulfonic acid to produce solutions having ratios of polyamide/dimethylolurea of 1/0, 1/1, 3/1, 7/1, 10/1 and 20/1 and in all cases employing the catalysts at a 0.7% level. 5 mil films were cast from these solutions on glass and, following evaporation of the major portion of solvent, the films were baked for 8 minutes at 160° C. An examination of the resulting films show that clarity is improved in all cases in comparison to the unmodified polyamide. Compositions between 1/1 and 10/1 ratios exhibited sparkling clarity whereas the 20/1 composition exhibited very slight haze but significant improvement over the unmodified polyamide. As a measure of temperature sensitivity tack of the various films was measured at 100° C. (via adhesion of paper). The 20/1 composition exhibited very slight tack, in comparison to high tack for the 1/0 composition and no tack for the remaining compositions. Sward hardness was found to be as follows: unmodified polyamide, 32; 1/1, 60; 3/1, 56; 7/1, 45; 10/1, 41; 20/1, 37. Resistance to attack by polar solvents is exemplified by resistance to ethanol, in which the unmodified polyamide is completely soluble. Results of exposure of the various films to ethanol are as follows: 1/1, resistant; 3/1, resistant; 7/1, softened; 10/1, softened; 20/1, partially dissolved.

EXAMPLE III

A copolyamide is prepared from hexamethylene diamine together with a mixture of dibasic acids composed of 41% of sebacic acid, 49% of 2-ethylsuberic acid and 9% of 2,5-diethyladipic acid. The polyamide exhibits an initial softening point of 110° C. with complete melt at 180° C., and an intrinsic viscosity of 1.29 (in 90% formic acid). This polyamide is combined with a low molecular weight unmodified urea-formaldehyde condensate (about 700 M.W.) in the ratio of 10 parts of polyamide to 1 part of urea resin according to the general procedure described in Example II. In this case, ethyl sulfonic acid is employed as the catalyst at a concentration of 0.2%. The cured film of the modified polyamide exhibits superior hardness, substantially greater resistance to attack by polar solvents, higher tack temperature, and greater clarity.

As previously set forth a modifier useful for the present purposes may be prepared by initially reacting the urea-formaldehyde condensate or resin with low molecular weight, aliphatic alcohols. In the following example a method for preparing such a modifier and the use of such a modifier to improve the properties of branched chain polyamides are demonstrated.

EXAMPLE IV

In a 1-liter, three-necked reaction flask, fitted with stirrer, reflux condenser, and thermometer, and heated by a constant temperature oil bath, 150 grams of formalin and 260 grams of butyl alcohol were placed. To this solution, 30 grams of urea were added and the mixture was stirred to dissolve the urea. The reaction is heated at 100° C. and then refluxed for one hour. After cooling, the pH is adjusted to 7.3–7.5 with ethyl phosphoric acid and the reaction is heated at 110° C. for 90 minutes. Following removal of the water of reaction and 50 cc. of butyl alcohol using a Stark and Dean dehydrating apparatus, the butylated urea-formaldehyde condensate is cooled, reduced with 80 cc. of toluene, and then suction filtered.

To 100 parts of a 5% by weight solution of the unmodified polyamide of Example I in ethanol (5.0 parts polyamide), .83 part of a 60% by weight solution of the butylated urea-formaldehyde condensate in a solvent mixture consisting of 60 parts butanol and 40 parts xylol were added (.5 part urea-formaldehyde resin). The condensate had a Gardener-Holt viscosity of L—Q at 25° C.; a specific gravity of 1.02 and an acid number of 5. The two materials were thoroughly mixed to obtain a homogeneous mixture which is then catalyzed with 2% p-toluenesulfonic acid using a 20% by weight solution of the catalyst in ethanol. A 5 mil wet film is cast on glass plate using a Bird film applicator. The solvent is removed as in Run 1 of Example I and the film is baked 10 minutes at 150° C. The cured film has greater clarity than the unmodified polyamide film and in addition is harder. The film also exhibited limited solubility in alcohol. It is softened by alcohol but not dissolved (compared to complete solubility for the initial polyamide), and the film is not dissolved or softened by xylol.

The above data show by utilizing the modifiers of this invention it is possible to significantly change and improve the above described branched chain polyamides. While particular embodiments of the invention are set forth above, it will be understood that the invention is obviously subject to variations and modifications without departing from its broader aspects.

What is claimed is:
1. A method for improving properties of a polyamide obtained by reacting (a) dicarboxylic acids selected from the group consisting of branched chain $C_{10}$ acids and mixtures thereof with straight chain $C_6$ to $C_{10}$ acids and (b) diamines, which comprises reacting said polyamide with a urea-formaldehyde condensate.
2. The method of claim 1 wherein said dicarboxylic acid is 2-ethylsuberic acid.
3. The method of claim 1 wherein said dicarboxylic acids are a mixture of 2-ethylsuberic acid, 2,5-diethyladipic acid and sebacic acid.
4. The method of claim 1 wherein said urea-formaldehyde condensate has a molecular weight within the range of about 85 to 2000.
5. The method of claim 1 wherein said urea-formaldehyde condensate is dimethylolurea.
6. The method of claim 1 wherein said reaction is carried out in the presence of an acid catalyst.
7. The method of claim 1 wherein said condensate is an alkoxy urea-formaldehyde condensate.
8. The method of claim 7 wherein said condensate is butylated urea-formaldehyde condensate.
9. The method of claim 6 wherein said acid catalyst is p-toluenesulfonic acid.
10. The product obtained in accordance with the process which comprises reacting a polyamide obtained by reacting (a) dicarboxylic acids selected from the group consisting of branched chain $C_{10}$ acids and mixtures thereof with straight chain $C_6$ to $C_{10}$ acids and (b) diamines, with a urea-formaldehyde condensate in the presence of an acid catalyst.
11. The product of claim 10 wherein said urea-formaldehyde condensate is dimethylolurea.

References Cited in the file of this patent

UNITED STATES PATENTS

| | | |
|---|---|---|
| 2,149,678 | Hovey et al. | Mar. 7, 1939 |
| 2,174,527 | Peterson | Oct. 3, 1939 |
| 2,379,413 | Bradley | July 3, 1945 |
| 2,816,916 | Frank et al. | Dec. 17, 1957 |